United States Patent [19]

Malik

[11] Patent Number: 5,991,290
[45] Date of Patent: Nov. 23, 1999

[54] METHOD AND SYSTEM FOR FORMING A DIGITAL FACSIMILE MESSAGE INCLUDING A SUBADDRESS

[75] Inventor: Naeem Iqbal Malik, Fremont, Calif.

[73] Assignees: Ricoh Company, Ltd., Tokyo, Japan; Ricoh Corporation, San Jose, Calif.

[21] Appl. No.: 08/655,079

[22] Filed: Jun. 3, 1996

[51] Int. Cl.$^6$ .............................. H04M 11/00; H04N 1/00
[52] U.S. Cl. ......................... 370/352; 370/392; 358/440; 379/100.01
[58] Field of Search ..................................... 370/389, 392, 370/352, 401, 522, 524, 313; 379/90.01, 93.01, 93.11, 100.01, 100.08, 100.14, 100.16, 359, 233, 199, 93.02, 100.15, 100.17, 207, 211, 221; 358/402, 403, 407, 440, 438, 434; 395/200.68, 200.79

[56] References Cited

U.S. PATENT DOCUMENTS

| | | | |
|---|---|---|---|
| 5,189,695 | 2/1993 | Maei | 370/524 |
| 5,206,743 | 4/1993 | Hochman et al. | 358/440 |
| 5,224,156 | 6/1993 | Fuller et al. | 379/88.01 |
| 5,291,546 | 3/1994 | Giler et al. | 379/93.11 |
| 5,488,651 | 1/1996 | Giler et al. | 379/100.14 |
| 5,517,556 | 5/1996 | Pounds et al. | 379/88.25 |
| 5,521,719 | 5/1996 | Yamada | 358/438 |
| 5,652,783 | 7/1997 | Keba et al. | 370/313 |
| 5,675,638 | 10/1997 | Ogasawara et al. | 379/220 |
| 5,748,723 | 5/1998 | Hanai et al. | 379/198 |

OTHER PUBLICATIONS

Nest Autoroute Code Definition, Novell Network NetWare Computing Products, Apr., 1995.
Will Fax–Routing Standard Deliver?, by Patrick Dryden, Oct. 10, 1994, pp. 27 & pp. 30.

Primary Examiner—Alpus H. Hsu
Attorney, Agent, or Firm—Oblon, Spivak, McClelland, Maier & Neustadt, P.C.

[57] ABSTRACT

A method and system for forming a digital facsimile message that includes a subaddress. A source terminal forms a digital facsimile message by using information input by a user in response to prompting inquiries generated by the source terminal. In response to a prompt, a user enters whether the user will enter a subaddress to route the message to a destination terminal. If an affirmative response is received, the source terminal prompts the user to input the subaddress and later to input a telephone number of a destination server which services the destination terminal. The source terminal receives a response from a user indicating whether the subaddress is used for the routing of the digital facsimile message. Based on the input data, the source terminal forms a digital facsimile message that includes the subaddress of the destination terminal. The message may then be sent over a communications channel to the destination server, which then routes the message to the destination terminal. The destination server may convert the subaddress into a matching Internet Protocol address of the destination terminal so that the destination server may route the source terminal's incoming message over the Internet to the destination terminal. The source terminal may also form a polling message by prompting the user to insert specific information, where the polling message allows a user to retrieve data files from the destination terminal.

13 Claims, 9 Drawing Sheets

METHOD AND SYSTEM FOR FORMING A DIGITAL FACSIMILE MESSAGE INCLUDING A SUBADDRESS

BACKGROUND OF THE INVENTION

1. Field of the Invention

The present invention pertains to communications systems and more particularly to methods for forming a message that includes a subaddress and for routing the message from a source terminal through a network destination server and to a destination terminal.

2. Discussion of the Background

Although facsimile machines have found a niche in the evolving field of computer and Radio Frequency (RF) communication networks, problems exist in "integrating" these paper-based legacy systems into modern communications networks. While advances have been made in the facsimile technology community that permit facsimiles to route messages within networks to particular destination terminals, each known option is cumbersome in that each option requires an operator to input long code words into a source facsimile machine.

The basic function of a facsimile machine is to scan and convert graphics material into digital signals and then transmit the digital signals, either locally or remotely, to another device that produces in record form a likeness of the subject graphics material. Most often, facsimiles are used to convert textual information from a hard-copy document into discrete electrical analog pulses which are transmitted over an analog telephone line to a destination facsimile, where the image is then reproduced.

Traditionally, two facsimile machines (source and destination) communicate through a direct-dialed telephone connection. The source facsimile initiates the connection between the two facsimile machines by dialing a telephone number of the destination facsimile. The connection is made when the telephone line rings at the destination facsimile location and the destination facsimile picks-up the line. The two facsimiles then exchange some "handshaking" information, after which the facsimile image is transmitted to the destination terminal. Included in the handshaking information is a terminal station identifier (TSI) field, which is used to announce to the destination facsimile machine the identity of the source facsimile machine.

Limitations with the above-described traditional approach are that it requires users at the destination and source terminals to manually interact with their respective facsimile machines, and requires a dedicated telephone line to service the destination facsimile machine. Clearly, dedicated lines and manual interaction are not desirable attributes for "integrating" facsimile machines into modern communications networks. The present inventor has determined that a need exists for facsimile machines to communicate to other terminals using the shared resources of a network, and to have a "user-friendly" user interface that makes it easy for a user to send messages to destination terminals connected to data networks.

Newer data network architectures solve part of the above-mentioned problems by connecting destination terminals to a destination server. These architectures allow multiple destination terminals to share a selected few telephone lines. The architectures include a source terminal connected to the destination server through a public switched telephone network (PSTN) line, which a user accesses by first dialing the telephone number of the destination server. Once the telephone number is dialed, the facsimile can provide to the destination server a facsimile message in digital format which the server may then route to network terminals (facsimile machines, computers with and without facsimile cards, or data communication networks that can receive image based information). The destination server does, however, require prior knowledge of a particular routing address in order to route a message to a corresponding destination terminal.

"Intelligent" servers acquire the destination terminal address by using software capable of extracting a routing address from an incoming facsimile message. Advances in facsimile machines, facsimile message protocols, and intelligent servers permit "subaddresses" (i.e., the routing address) to be included as part of the facsimile message formed at a source facsimile terminal. One example of an advancement in the subaddressing field is U.S. Pat. No. 5,206,743, which discloses a methodology for including a subaddress in the Transmit Station Identifier (TSI) field of a facsimile message. The subaddress, as well as other information, is inserted by the operator at the source facsimile.

A limitation with the above-described subaddress methodology is that it requires the operator to enter a lengthy code word. The lengthy code word is both difficult for the user to remember and too long to be displayed on some facsimile machine displays. In particular, the operator inputs a consecutive string of characters including a destination telephone number, a five digit subaddress suffix and unique control characters (i.e., "#" and "*" characters) appropriately spaced in the code word to distinguish the subaddress from other fields in the message. This method is awkward in that a user has to remember a long string of characters that form the code word, and remember precisely where in the code word to insert the control characters. Furthermore, if the capacity of the facsimile's display is less than the length of the code word, a portion of the code word will scroll off of the display, thereby forcing the user to enter the remainder of the code word without the benefit of seeing the full string of characters already entered by the user.

NOVELL, Inc. offers for sale NetWare® version 4.1, as described in the document NEST Autoroute Code Definition, ©1995 Novell, Inc., part number 106-000644-001, the substance of which is incorporated herein by reference. NetWare® version 4.1 is a software product hosted on a destination server that permits an incoming facsimile message to be routed to a destination terminal as long as the incoming message is formatted in the NEST autoroute© code. The NEST autoroute© code requires the source terminal to produce a consecutive string of characters forming a code word, like that described above in reference to U.S. Pat. No. 5,206,743. The code word includes the subaddress, the destination telephone number, and unique characters used to separate the subaddress. The destination server changes the subaddress into an "identification number" that is unique to the destination terminal. The "identification number" is not a universal address (such as an Internet Protocol (IP) address or an asynchronous transfer mode (ATM) address). While, facsimile machines conforming to the CCITT G3 (Comite Consultatif Internationale de Telegraphique et Teleponeque Group 3) format are compatible with NetWare® version 4.1, the operator of the source facsimile is inconvenienced by having to remember the code word.

The NOVELL NetWare® software also provides a "polling" feature that provides a source terminal with remote access to files located on a destination terminal. A limitation with this polling approach is that it does not provide a means by which a remote facsimile terminal can conveniently input a polling instruction.

SUMMARY OF THE INVENTION

Accordingly, one object of this invention is to provide a novel method and system for forming a digital message that overcomes the above-mentioned limitations of existing methods and systems.

It is a further object of the invention to provide a method and system for forming a digital message where a source terminal prompts a user to enter whether a subaddress is used for routing the digital message.

It is a further object of this invention to provide a novel method and system for routing the digital message through a communications channel and a network for receipt at a destination terminal, thereby alleviating the above-mentioned limitations of existing methods and apparatuses.

It is another object of the present invention to provide a method and system for routing a digital message through a destination server to a destination terminal without a user having to enter a long code word containing unique characters.

It is yet another object of the present invention is to provide a method and system for forming a polling message used for polling the destination server in order to remotely access data files resident on a destination terminal.

It is still a further object of the invention is to provide a method and system for converting a subaddress into an Internet Protocol address of a destination terminal.

The present invention teaches a novel approach for forming a digital facsimile message that includes a subaddress of a destination terminal that is used to route the message to the destination terminal via a destination terminal. In a step-by-step fashion, the source terminal prompts the user to enter information about whether the user intends to route a message to a destination terminal, the telephone number (i.e., the "fax number") of the destination server that services the destination terminal, and the subaddress of the destination terminal. The source terminal takes the information input by the user in response to each prompting inquiry and forms a facsimile message that conforms to the CCITT G3 facsimile subaddressing standard. Thus, the source terminal forms a message having a terminal station identifier (TSI) field including the subaddress input by the user and "+" symbols automatically inserted by the source terminal to distinguish the subaddress from other parts of the TSI field. The formed message is then sent from the source terminal to the destination server where the destination server extracts the subaddress and routes the message to the destination server according to the extracted subaddress.

The present invention can form a polling message, which is a special form of a digital message sent from the source terminal to the destination server and used to retrieve a file from a destination terminal. The present invention includes a method and apparatus that automatically forms a polling message at the source terminal by prompting the user to input specific information about the file to be retrieved and the address of the location from which the file is to be retrieved. Based on the data input by the user, the source terminal forms the polling message by placing the input subaddress in the TSI field along with a special polling code and a file "identifier" used to identify the file to be retrieved. The source terminal forms the message by automatically inserting unique "+" symbols in order to separate the subaddress, the polling code, and the file identifier from other parts of the digital message.

The present invention also describes a method and apparatus for converting, at the destination server, a received subaddress into an Internet protocol (IP) address of the destination terminal. The destination server receives the digital message from the source terminal, extracts the subaddress, and uses the extracted subaddress to find an IP address that matches the subaddress. The IP address allows the destination server to route messages to destination terminals that reside on networks other than the network served by the destination server.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
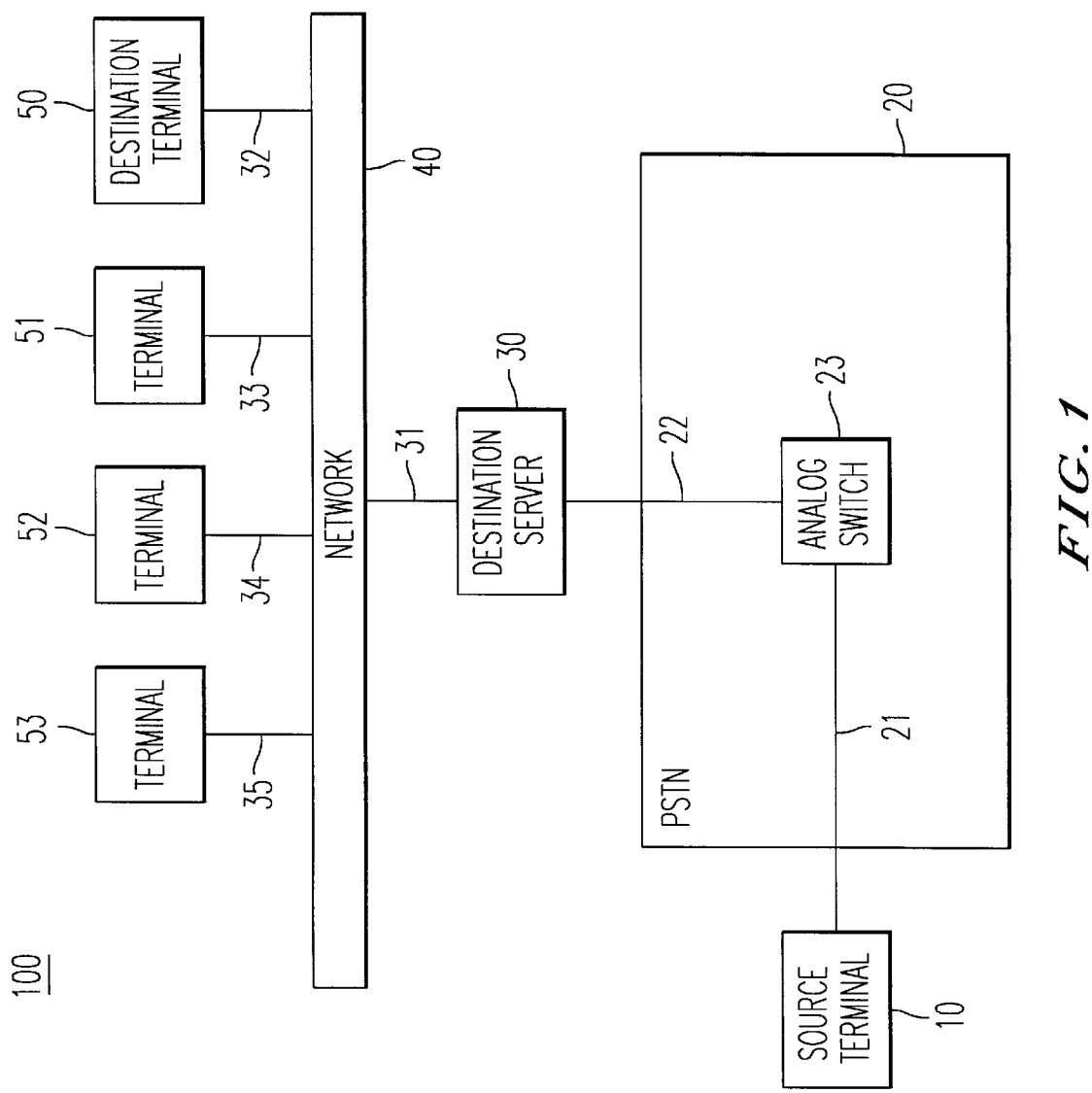
FIG. 1 is a schematic diagram showing a communications system with a network routing architecture.

Referring now to the drawings, wherein like reference numerals designate identical or corresponding parts throughout the several views, and more particularly to FIG. 1 thereof, there is illustrated a digital communication system 100. The digital communications system 100 includes a source terminal 10 such as a Ricoh Corp. facsimile model FAX2700 and a destination terminal 50, such as an AST Bravo LC 4/66d personal computer, where the system 100 permits routing of a digital facsimile message sent from the source terminal 10 to the destination terminal 50. The source terminal 10 is preferably a facsimile machine although it could be a scanner/computer combination, or simply a computer holding a data file.

The source terminal 10 is connected via an analog line 21 to a public switch telephone network (PSTN) 20, which includes the analog line 21, an analog switch 23, and a second analog line 22. The destination server 30, preferably a '486 workstation using NetWare® version 4.1 network administration software, as described in NEST Autoroute Code Definition, ®1995 Novell Inc., part number 106-000644-001, connects to the PSTN 20 through the second analog line 22. At a destination site, the destination server 30 connects via node 31 to the data communication network 40 (preferably a local area network (LAN), but a wide area network (WAN) is suitable). The network 40 is preferably a Novell, Inc. Ethernet backbone (e.g., as defined by Institute of Electrical and Electronics Engineers Standard 802.3), although other networks could be used including other Ethernet variants, Fiber distributed data interface (FDDI) networks, wireless networks, Internet, and other networks. The network 40 and the Netware® software used on the destination server 30 support the CCITT Group 3 T.30 fax protocol, and thus also support CCITT G3 fax protocol subaddressing feature of the G3 T.30 fax protocol. The network 40 respectively connects via a set of network nodes 32, 33, 34 and 35 to respective terminal 50 and network terminals 51, 52 and 53 (e.g., computers, printers, other facsimile machines, routers, switches, access points to other networks, ATM devices, etc.).

Figure 2:
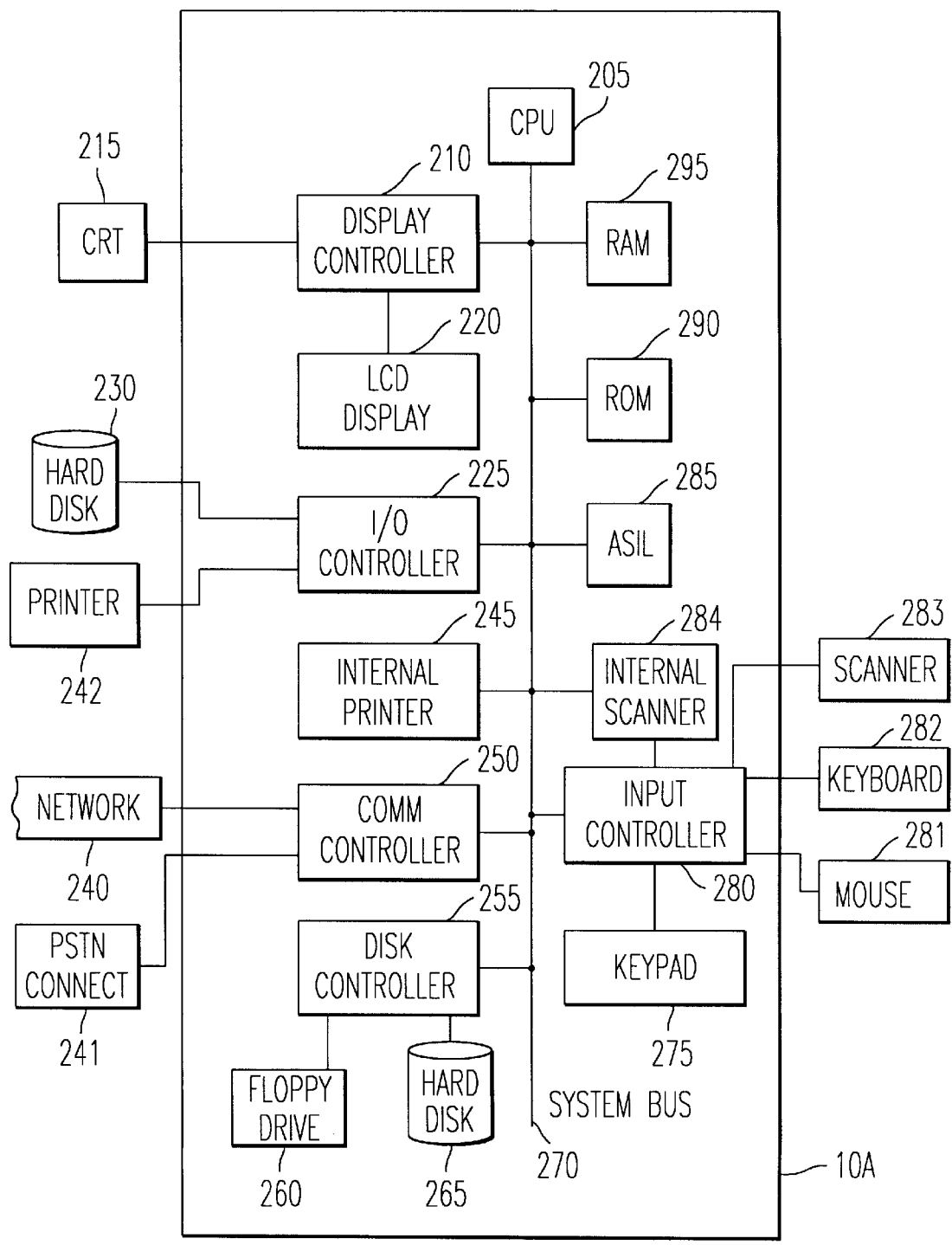
FIG. 2 is a schematic diagram of an electronics portion of a source terminal.

FIG. 2 is a schematic diagram of an electronics portion 10A of the source terminal 10. The electronics portion 10A includes a system bus 270 that interconnects a variety of components that populate the system bus 270. A central processing unit (CPU) 205 is one component that populates the bus and provides general purpose control of the source terminal 10, as well as bus administration functions for system bus 270. The CPU 205 has available to it system random access memory (RAM) 295 for temporary storage use, non-volatile read only memory (ROM) 290 for program and parameter storage, and application specific integrated circuit (ASIC) 285 for performing specialized data manipulation. The ASIC 285 could be augmented with other data manipulation devices such as field programmable gate arrays (FPGA, not shown), programmable logic devices (PLDs, not shown) and other processing units (not shown). Also available as system resources are a disk controller 255, which controls an internal floppy drive 250 and a hard disk 265, and an input/output (I/O) controller 225, which controls an external hard disk 230 and an external printer 242. Either the external printer 242 or an internal printer 245 may be used to print text and data files output by the source terminal 10.

The electronics portion 10A also includes an input controller 280 that controls an internal scanner 284 (common in traditional facsimile machines), an optional external scanner 283, an external keyboard 282, an external mouse 281, and an internal keypad 275. Under the control of the input controller 280, either the internal scanner 284 or the external scanner 283 may be used to capture an image of an object document and convert the image into a digital data stream that is passed through the input controller 280 to the system bus 270 for further processing. The input controller 280 also receives input from keypad 275, which serves as a basic data input device for source terminal 10, although the keyboard 282 and the mouse 281 serve as alternative input devices.

A display controller 210 is used to control either, or both, of an external cathode ray tube (CRT) display 215 and an internal liquid crystal display (LCD) 220. Other display formats would also be suitable, including plasma displays, active and passive light emitting diode (LED) displays, etc. The displays 215 and 220, in tandem with the keypad 275, the keyboard 282, and the mouse 281, serve a user interface function.

A communications controller 250 also resides on the system bus 270 and connects to an external network 240 and an external (or internal) PSTN connection 241. The connection to the network 240 corresponds to the type of network to which the source terminal 10 interfaces. The PSTN connection 241 is preferably an RJ-11 connection, although other connections are possible such as if the source terminal 10 connects to an Integrated Services Data Network (ISDN) line, a broadband ISDN (b-ISDN) line, or a wireless access provider.

Figure 3:
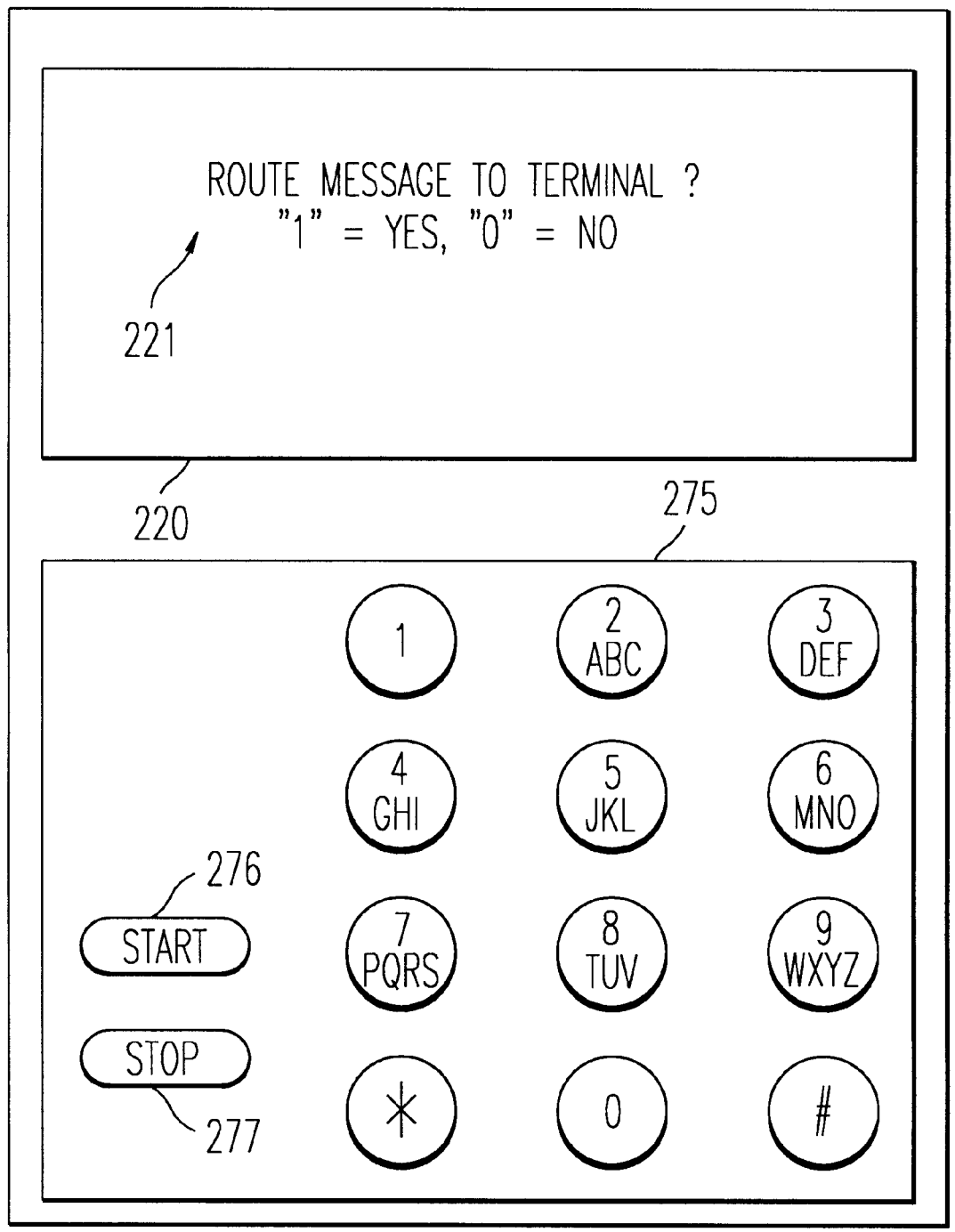
FIG. 3 is a plan view of a display and a keypad of a source terminal.

FIG. 3 illustrates the display 220 and the keypad 275 of source terminal 10. The keypad 275 includes a 12-digit numeric keypad, a "start" key 276 and a "stop" key 277. Data input by a user on the keypad 275 is echoed (i.e., displayed) on the display 220 so that the user knows what the user entered at any given time. In addition, display 220 also includes text, generated by source terminal 10 which "prompts" the user to enter specific information at a specific time. For example, in FIG. 3, the display 220 is prompting the user to enter a "1" if the user wishes to route a message to a terminal, and enter a "0" if the user chooses not to route a message to a terminal. Other prompting messages are displayed at other times.

Figure 4:
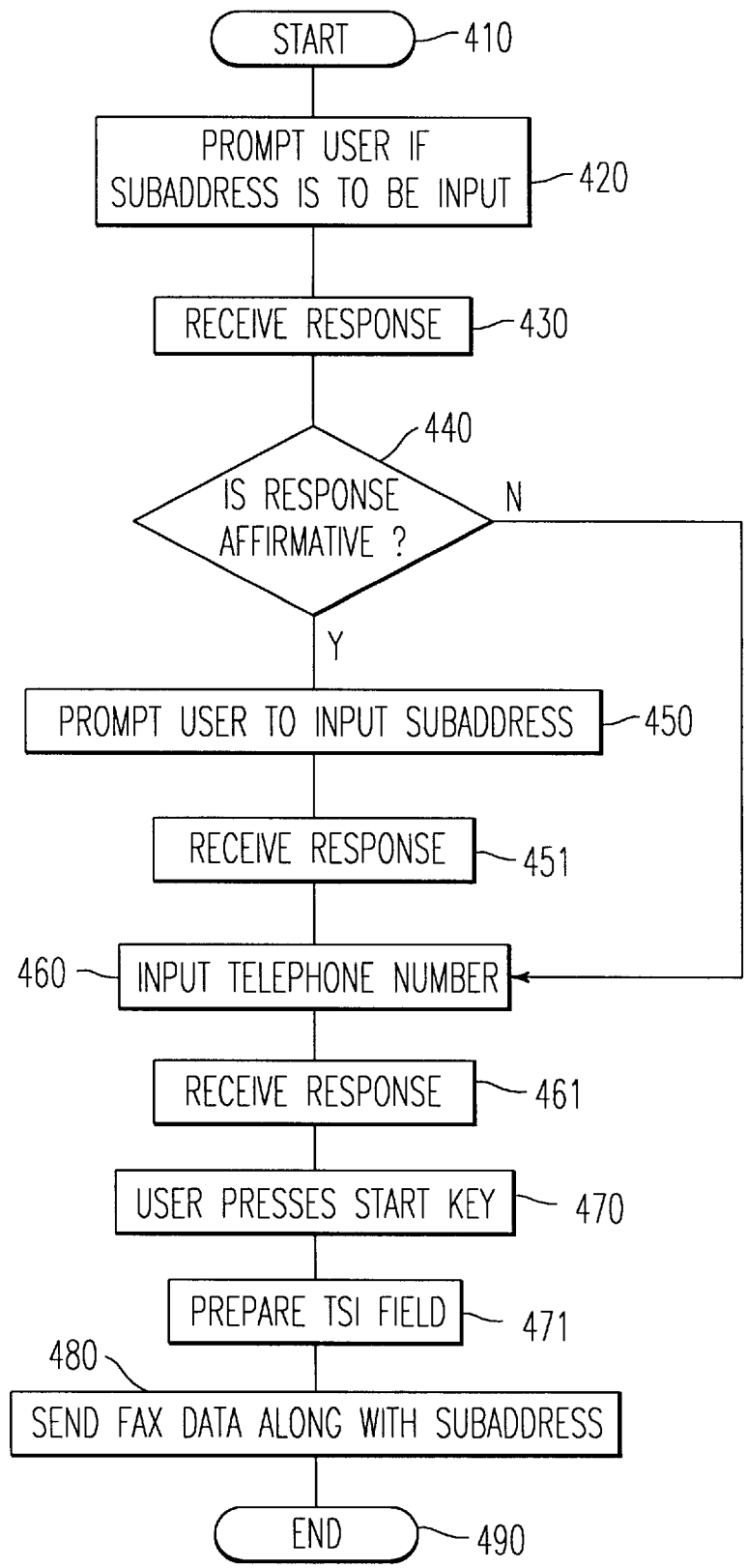
FIG. 4 is an exemplary process flowchart for a method of forming a digital message and sending the formed message to a destination terminal.

FIG. 4 sets forth a flowchart illustrating a method by which a user inputs information into the keypad 275 (shown in FIG. 3) to form a digital routing message that will be routed to the destination terminal 50 via the PSTN 20 and the destination server 30 (each of which are shown in FIG. 1). A user starts the process in step 410 by pressing the start key 276 on the keypad 275 (shown in FIG. 3). In step 420 the source terminal 10 responds by prompting the user to enter whether a 4-digit subaddress (or an alphanumeric sequence of varying length) will be input, and asking the user to input a "1" indicating an affirmative (yes, y) response or a "0" indicating a negative (no, n) response. The example of a prompt message (element 221) is shown in FIG. 3. Step 430 receives the user's response indicative of the user's intent to input a subaddress. Then, step 440 determines if the received response is affirmative. If not, step 460 prompts the user to input the destination server's telephone number. If the response determined by step 440 is affirmative, step 450 prompts the user to input the subaddress associated with the destination terminal 50. In response to the user inputting the subaddress, step 451 receives, and temporarily stores, the input 4-digit subaddress. Preferably, the source terminal 10 will automatically recognize an entry of a fourth digit of the subaddress by an internal counter that counts the number of digits input. When the fourth-digit is automatic recognized, step 460 prompt the user to input the destination server's telephone number, and then step 461 receives and temporarily stores the input telephone number. After completing step 461, Step 470 is a user pressing the start key 277 of keypad 275 (shown in FIG. 3), preferably without the assistance of a prompting message displayed on display 221, although a prompting message would only add two more steps to the process. In response to step 470, step 471 prepares a TSI field as explained below in the description of FIG. 5C, and step 480 sends the prepared TSI field, including the subaddress, to the destination terminal and the process ends in step 490. According to this method, the user is prompted in incremental steps to enter the required data. Thus the user need not enter a long code word comprising the destination telephone number, unique symbols, and a subaddress.

Figure 5A:
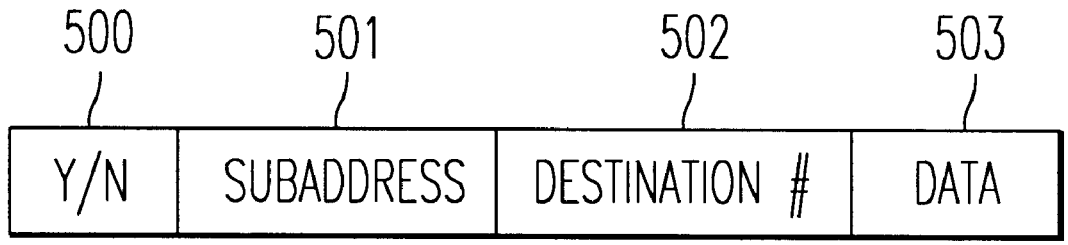
FIG. 5A is a diagram showing a time-sequence of data fields for data to be input to a source terminal in preparation for forming a digital message.
Figure 5B:
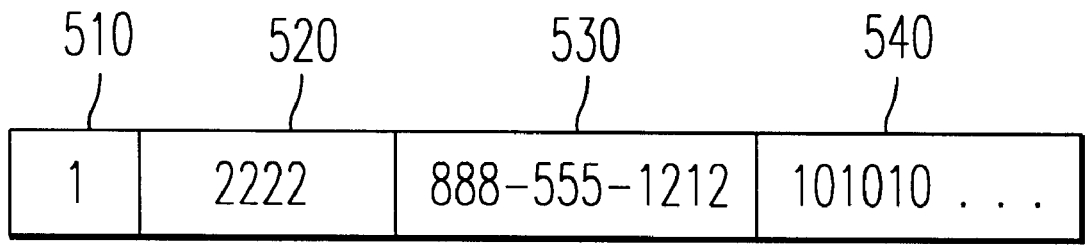
FIG. 5B is an diagram showing an example time-sequence of data input to a source terminal in preparation for forming a digital message.

FIG. 5A illustrates a time-sequence of labeled data fields input to the source terminal 10 by a user prior to routing a message. FIG. 5B includes a set of example data values that correspond to the data fields of FIG. 5A. A data field 500, of FIG. 5A, holds a value indicative of a user's response, "yes" or "no", to the source terminal 10 prompting a user to enter a "1" or a "0" indicative of the user's intent to enter a subaddress. In the example shown in FIG. 5B, a corresponding exemplary data field 510 holds a value "1", indicative of the user's intent to input a subaddress. Data field 501, of FIG. 5A, holds a subaddress input by the user. Corresponding exemplary data field 520 of FIG. 5B holds a value "2222", which is indicative of a subaddress corresponding to a destination terminal to which the digital message will be routed. Data field 502 holds a telephone number of a destination server 30 (shown in FIG. 1). Corresponding exemplary data field 530 of FIG. 5B holds a value "888-555-1212", which indicates the telephone number that the source terminal 10 will dial in order to establish a telephone link through the PSTN 20 to the destination server 30 (each shown in FIG. 1). The last data entered into source terminal 10, is data field 503, which holds the image data to be transmitted. However, the digital data 503 is not entered through the user interface; rather it is through scanner 283, internal scanner 284, network 240, I/O controller 225, or disk controller 255 (each shown in FIG. 2).

Figure 5C:
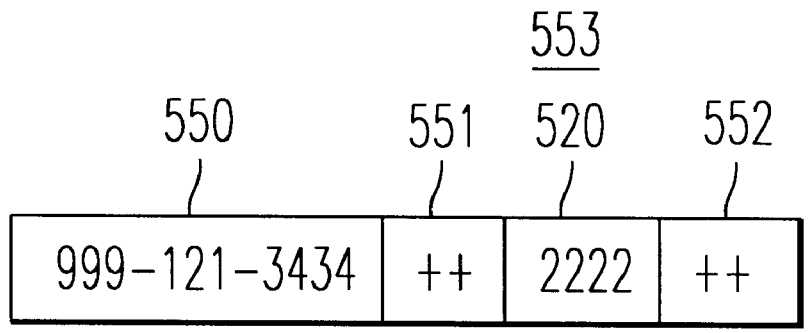
FIG. 5C is a diagram showing a portion of a TSI field of a message formed by a source terminal.

Based on the data input as shown in FIGS. 5A and 5B, source terminal 10 forms a portion of a TSI field 553 that includes data field elements 550, 551, 520, and 552, as shown in FIG. 5C. The portion of the TSI field 553 is received at the destination server 30, and selected information from the portion of the TSI data field 552 is extracted by the destination server 30 in order to route the data 503 (shown in FIG. 5A) to destination terminal 50. The element 550 is a source identifier, shown as a telephone number "999-121-3434" of the source terminal 10, and is included in the TSI field in order to identify to the destination terminal 50 the identification of the source terminal 10.

Data field 551 is formed by the source terminal 10 automatically inserting, during step 471 of FIG. 4, "++" symbols before the subaddress 520 (e.g., "2222"). Data field 552 is similarly automatically formed by source terminal 10 inserting "++" symbols after the example subaddress 520. Inserting the "++" symbols in data fields 551 and 552 places the TSI field in a format compatible with CCITT G3 subaddressing requirements, and thus, allows destination server 30, which uses the NetWare® version 4.1 software or other software conforming to the same TSI format, to extract the input subaddress 501 (of FIG. 5A) and thus route the data 503 to the appropriate destination terminal 50. It is noted that the "+" symbols are included as part of the CCITT G3 format because facsimile machines, such as Ricoh's Fax2700, conventionally convert a "*" or "#" entered on a 12-digit keypad into a "+" symbol.

Once the portion of the TSI field 553 is sent, destination server 30 receives the example subaddress 520 during a handshake of the source and destination server terminals, and converts the input subaddress 501 into a network address corresponding to destination terminal 50. Later, the destination server 30 (shown in FIG. 1) formats the message in the appropriate network protocol and routes the message to the destination terminal 50. Once all of the message information has been transmitted from source terminal 10 (shown in FIG. 1) to destination server 30 (shown in FIG. 1), destination server 30 acknowledges receipt and the call terminates.

Figure 6:
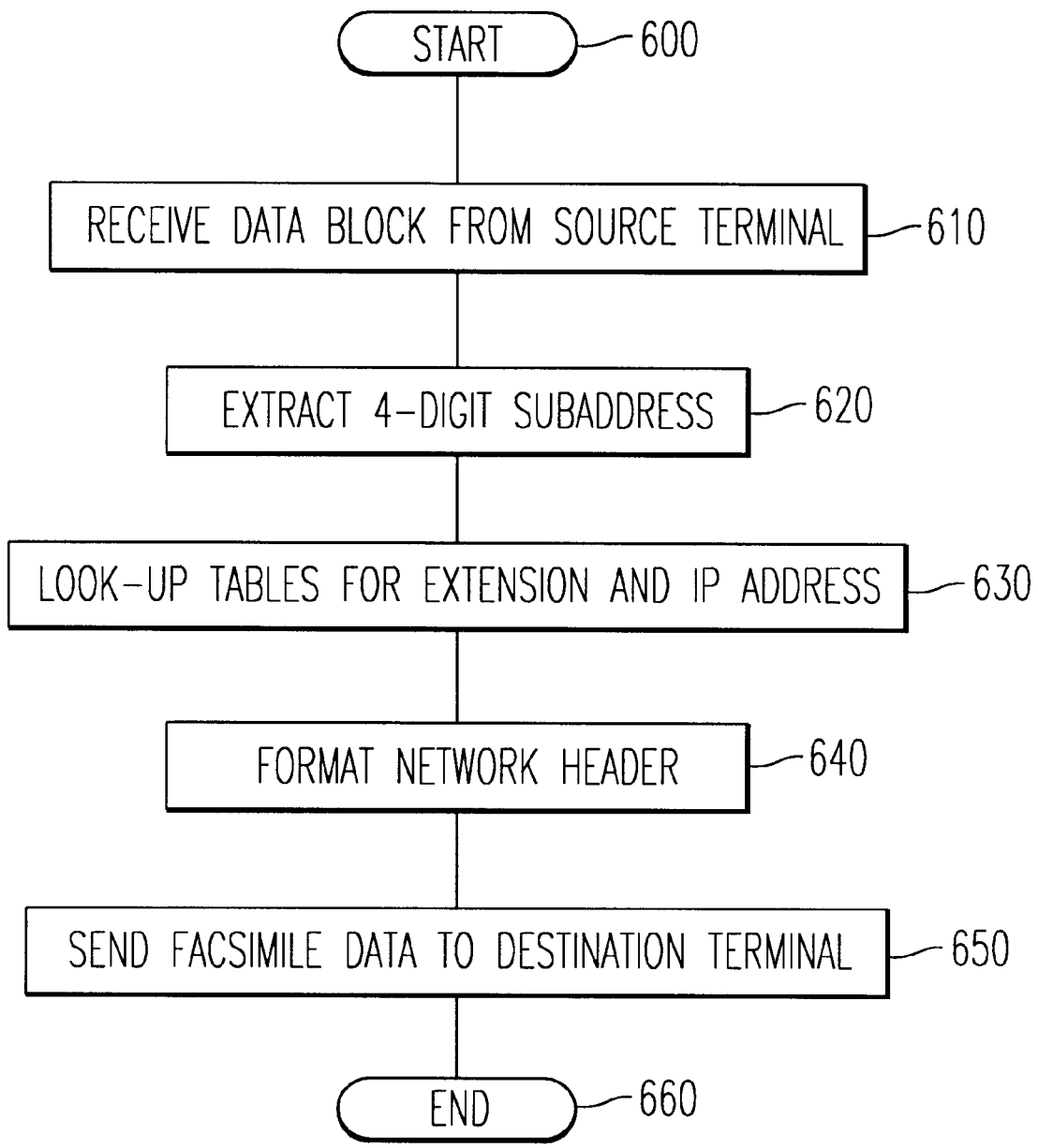
FIG. 6 is an exemplary process flowchart for converting a subaddress received by a destination server to the network address of a destination terminal.

FIG. 6 is a flowchart illustrating a process by which destination server 30 converts the subaddress into a network address, preferably an IP address, that will be used to route the message data 503 (shown in FIG. 5A) to destination terminal 50 (shown in FIG. 1). Step 600 starts the process and proceeds to step 610 which receives the TSI data field (e.g., data block) that was sent from the source terminal 10. Once received, step 620 extracts the 4-digit subaddress from the TSI data field by identifying the preamble "++" symbols 551 (shown in FIG. 56) and extracting the four digit address that follows. Then step 630 compares the extracted four digit subaddress to a set of IP addresses (or other network addresses, including ATM addresses and proprietary network extensions) stored in a look-up table of a memory and identifies a corresponding a single IP address that matches the four-digit address. Once the IP address is found, step 640 uses the matching IP address to create a network message header in a protocol format consistent with the Novell, Inc. Ethernet network 40 (shown in FIG. 1), or another network in which destination server 30 (shown in FIG. 1) resides. After the message header is created, step 650 sends the facsimile data, which was earlier received by the destination server 30, to the destination terminal 50 (shown in FIG. 1) in a network message. After all of the facsimile data has been transmitted to the destination terminal 50 and relayed to the destination terminal 50, the process ends in step 660.

Figure 7:
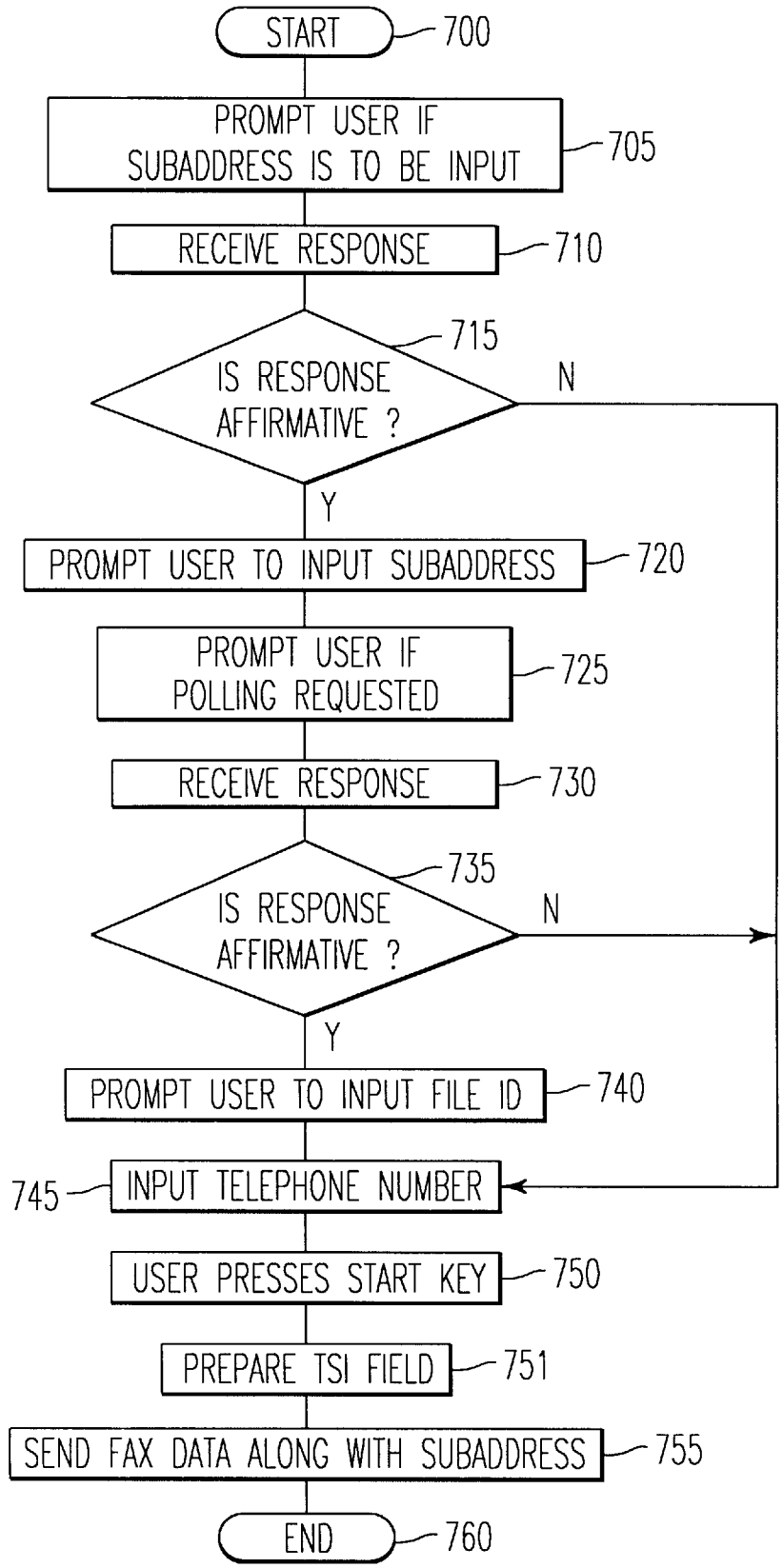
FIG. 7 is an exemplary process flowchart for forming and sending a digital polling message.

FIG. 7 describes a method of the second embodiment of the present invention by which a polling message is formed. A polling message is a special type of digital message that requests the destination server to retrieve a data file from a destination terminal and relay the file to the source terminal. The polling message is similar to the routing message described in the first embodiment, but additional polling fields are added to the TSI field 553 of the first embodiment. Steps 700, 705, 710, 715, 720, 745, 750, 755, and 760 will not be described in detail because they correspond with the steps set forth in FIG. 4 of the first embodiment. The method steps for forming a polling message are different from that of the first embodiment in that after step 720, step 725 prompts a user to input a "1" on keypad 275 (see FIG. 3) indicating an affirmative (yes, y) response or a "0" indicating a negative (no, n) response if the user wishes to poll the destination terminal 50. As prompted by step 725, step 730 receives the user's response indicative of the user's intent to input a polling request. Then, step 735 determines if the received response is affirmative. If not, step 745 prompts the user to input the destination server's telephone number. If the response is affirmative, step 740 prompts the user to input a file identification (ID) associated with a file to be retrieved from destination terminal 50 (shown in FIG. 1). In addition to prompting the user, step 740 also receives, and temporarily stores, the input file ID. Preferably, the source terminal 10 will automatically recognize when the second digit of a two digit file ID is input on keypad 275 (shown in FIG. 3). However, the process could be augmented with additional process steps that instruct the user to indicate when the user completely enters the file ID. Step 745 then prompts the user to input the destination server's telephone number, and receives and temporarily stores the input telephone number. In step 750, after the telephone number is received, a user presses start key 277 (shown in FIG. 3), and in response, step 751 prepares a TSI field, which includes the polling request as explained below in FIG. 8C. After the TSI field is formed, step 755 sends the formed TSI field, including the subaddress, the file ID, and a polling code, to the destination terminal 50 and the process ends in step 760.

Figure 8A:
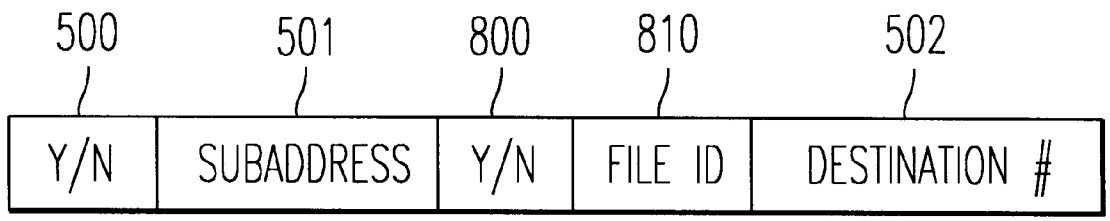
FIG. 8A is a diagram showing a time-sequence of data fields input to a source terminal prior to forming a polling message.

FIG. 8A illustrates a time-sequence of labeled data fields input to the source terminal 10 by a user prior to forming and routing a polling message to the destination terminal 50.

Figure 8B:
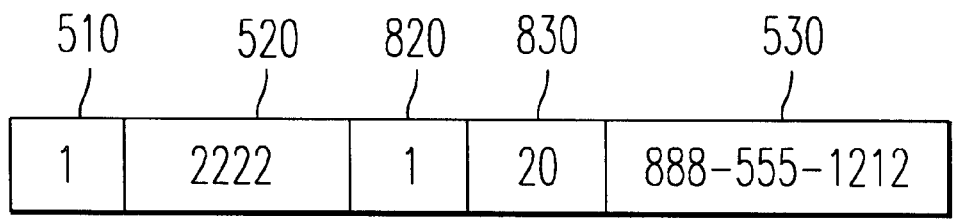
FIG. 8B is an diagram showing an example time-sequence of data input to a source terminal prior to forming a polling message.

FIG. 8A includes input data fields 500, 501, 800, 810 and 502, and FIG. 8B includes example values corresponding to the data fields in FIG. 8A. Data fields 500, 501, and 502 have been described with respect to FIG. 5A of the first embodiment, and data fields 510, 520, and 530 have been described with respect to FIG. 5B of the first embodiment so they will not be described in detail herein. Data field 800 holds a value indicative of a user's response, "yes" or "no", to the source terminal 10 prompting a user to enter a "1" or a "0" indicative of the user's intent to enter a polling request. In the example shown in FIG. 8B, a data field 820 corresponds to data field 800, and holds a value "1", thus indicating the user intent to input a polling request. The data field 810 holds a file ID, as input by the user, of a file to be retrieved from destination terminal 50. The example file ID shown in corresponding data field 830 is "20", which indicates the user wishes to retrieve from destination terminal 50 the file identified as file "20". Of course the destination terminal from which file "20" will be retrieved is identified by the subaddress held in the data field 501.

Figure 8C:
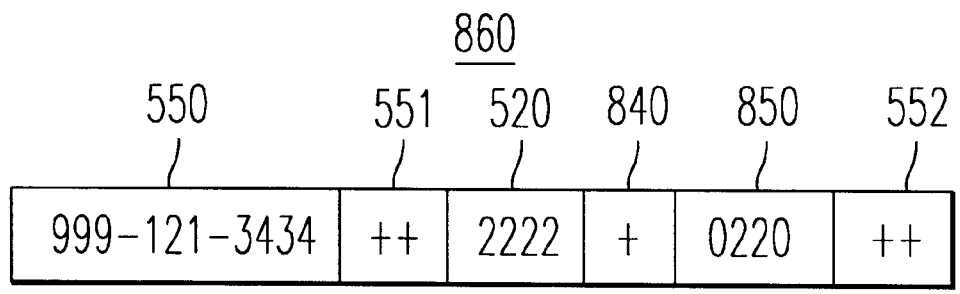
FIG. 8C is a diagram showing a portion of a TSI field of a polling message formed by a source terminal.

FIG. 8C shows a portion of the TSI field 860 including the requisite polling request information required by the NetWare® version 4.1 software needed to complete the polling request. Data fields 550, 551, 520, and 552 are like those described in reference to FIG. 5C and thus will not be described herein. Data field 840 holds a single "+" symbol input by source terminal 10 and is positioned after data field 520 in order to identify to the destination server 30 that a special request is being made. In the example shown, data field 850 includes the code "0220", which according to the NetWare® version 4.1 software, indicates to the destination server 30 (shown in FIG. 1) that the first two digits "02" are a polling request to retrieve a file identified as file "20" from the destination terminal found at subaddress "2222". In response to receiving the TSI field 860, the destination server 30 will retrieve file "20" over network 40 (shown in FIG. 1) from the destination terminal 50 (shown in FIG. 1) and relay the retrieved file "20" to source terminal 10 (shown in FIG. 1).

While the above description of the second embodiment of the present invention is directed towards the retrieval of a data file in a polling operation, it is clear that the present structure is also useful for performing other aspects of polling operations. In particular, the present structure can be used for attributing billing arrangements to the requesting source (i.e., in this case source terminal 10), multi-station routing, multi-document retrieval, as well as other functions.

A third embodiment of the present invention is the same as that of the second embodiment although analog lines 21 and/or 22 are replaced with a wireless communications channel(s) preferably a narrowband Advanced Mobile Phone System (N-AMPS) cellular channel of the type used in North America cellular telephone communication systems. However, other wireless communications channels would be suitable including Global System for Mobile communications (GSM), Personal Communications Services (PCS), cordless telephone channels and the like. In this embodiment, destination server 30 and/or source terminal 10 are equipped with wireless modems, which replace the analog lines 22 and line 21 of FIG. 1. Also, the PSTN connection 241 of FIG. 2 would be a wireless modem connection.

Figure 9:
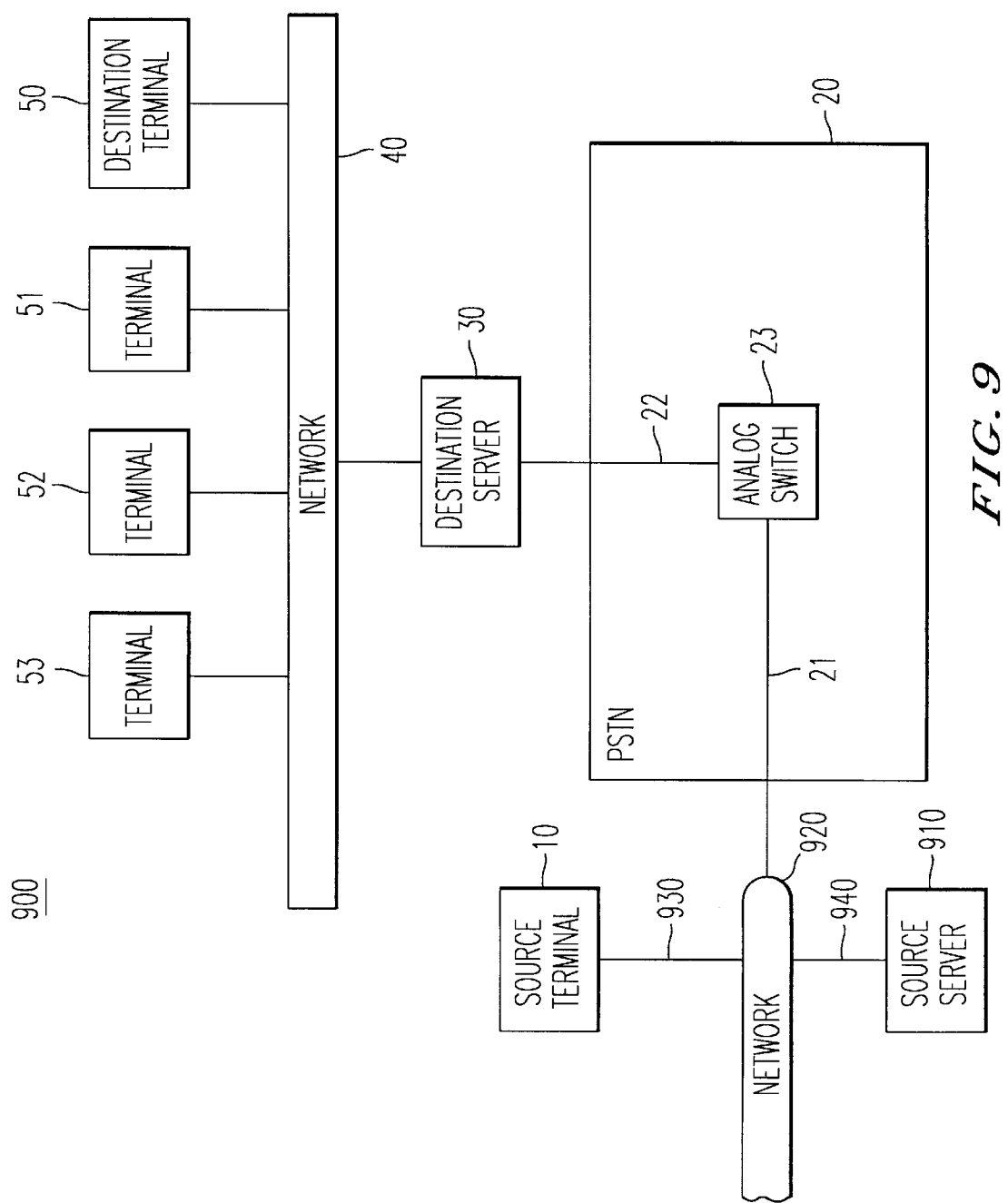
FIG. 9 is a schematic diagram of a second embodiment of the present invention showing a communications system with a network routing architecture.

A fourth embodiment of the present invention is described with reference to a communications system 900 shown in FIG. 9, where source terminal 10 is connected to a network 920. More particularly, the source terminal 10 is connected to the network 920 through a node 930, and a node 940 connects a source server 910 to the network 920. Source server 910 is connected to an analog line of PSTN network 20, as is described in FIG. 1, or to a wireless channel as described in the third embodiment. A telephone number and a subaddress input to source terminal 10 are used to form routing and polling messages consistent with those described in the other embodiments disclosed herein.

However, in contrast to the other embodiments, a destination server's telephone number, a subaddress and a facsimile data generated by source terminal 10 are routed through the node 930 and the network 920 to the source server 910 where source server 910 then converts the source network message into a format suitable for transmission over the PSTN 20 (or a wireless channel, or a data communications network). Source server 910 preferably includes a modem pool comprising a plurality of modems.

As is clear from the symmetrical architecture of communications system 900, destination terminal 50 may also poll a terminal (e.g., source terminal 10) of network 920.

Obviously, numerous (additional) modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. A method for forming a digital facsimile message comprising the steps of:
   prompting a user at a source terminal to enter whether a subaddress is used for routing the digital facsimile message to a destination terminal in a network via a destination server;
   receiving a response from the user indicating whether the subaddress is used for the routing of the digital facsimile message;
   inputting from the user the subaddress, when an affirmative response is received by the receiving step;
   inputting from the user a telephone number of the destination server to which the digital facsimile message is to be sent;
   forming a digital facsimile message which includes the subaddress, when an affirmative response is received by the receiving step;
   sending the digital facsimile message through a communications channel to the destination server;
   converting at the destination server the subaddress into a network address; and
   routing the digital facsimile message through the network to the destination terminal using the network address, wherein,
   said converting step comprises converting the subaddress to at least one of an Internet Protocol address and an asynchronous transfer mode address.

2. A method for forming a digital facsimile message comprising the steps of:
   prompting a user at a source terminal to enter whether a subaddress is used for routing the digital facsimile message to a destination terminal in a network via a destination server;
   receiving a response from the user indicating whether the subaddress is used for the routing of the digital facsimile message;
   inputting from the user the subaddress, when an affirmative response is received by the receiving step;
   inputting from the user a telephone number of the destination server to which the digital facsimile message is to be sent;
   forming a digital facsimile message which includes the subaddress, when an affirmative response is received by the receiving step;

sending the digital facsimile message through a communications channel to the destination server;

converting at the destination server the subaddress into a network address; and routing the digital facsimile message through the network to the destination terminal using the network address, wherein, said sending step comprises sending the digital facsimile message through a wireless communications channel.

3. A method for forming a digital facsimile message comprising the steps of:

prompting a user to enter whether a subaddress is used for routing the digital facsimile message;

receiving a response from the user indicating whether the subaddress is used for the routing of the digital facsimile message;

inputting from the user the subaddress, when an affirmative response is received by the receiving step;

inputting from the user a telephone number to which the digital facsimile message is to be sent; and forming a digital facsimile message which includes the subaddress, when an affirmative response is received by the receiving step, said prompting step comprises prompting the user to enter a four-digit character string representative of the subaddress.

4. A method for forming a digital facsimile message comprising the steps of:

prompting a user at a source terminal to enter whether a subaddress is used for routing the digital facsimile message to a destination terminal in a network via a destination server;

prompting the user to enter an identification of a file to be retrieved from said destination terminal;

receiving a response from the user that identifies the file to be retrieved from said destination terminal;

receiving a response from the user indicating whether the subaddress is used for the routing of the digital facsimile message;

inputting from the user the subaddress, when an affirmative response is received by the receiving step;

inputting from the user a telephone number of the destination server to which the digital facsimile message is to be sent;

forming a digital facsimile message which includes the subaddress, when an affirmative response is received by the receiving step;

sending the digital facsimile message through a communications channel to the destination server; and converting at the destination server the subaddress into a network address wherein said forming step comprises forming a polling message which includes the identification of the file to be retrieved from the destination terminal.

5. The method of claim 4, further comprising the steps of:

sending the polling message to the destination server;

retrieving the identified file from the destination terminal in accordance with the polling message; and relaying the identified file retrieved in said retrieving step to the source terminal.

6. A method for forming a digital facsimile message comprising the steps of:

prompting a user at a source terminal to enter whether a subaddress is used for routing the digital facsimile message to a destination terminal in a network via a destination server;

receiving a response from the user indicating whether the subaddress is used for the routing of the digital facsimile message;

inputting from the user the subaddress, when an affirmative response is received by the receiving step;

inputting from the user a telephone number of the destination server to which the digital facsimile message is to be sent;

forming a digital facsimile message which includes the subaddress, when an affirmative response is received by the receiving step;

sending the digital facsimile message through a communications channel to the destination server;

converting at the destination server the subaddress into a network address; and routing the digital facsimile message through the network to the destination terminal using the network address, wherein, said converting step further comprising the steps of,
extracting the subaddress from the digital facsimile message,
finding in a look-up table an Internet Protocol address that matches the subaddress, and
forming a network message based on the Internet Protocol address found in said finding step.

7. The method of claim 6, wherein:

said extracting step comprises extracting the subaddress from a transmit station identifier field of the digital facsimile message.

8. An apparatus comprising:

a source terminal having
an input device on which a user inputs data,
means for prompting the user to enter whether a subaddress is used for routing a digital facsimile message to a destination terminal in a network via a destination server,
means for receiving a response input from the user on said input device, said means for receiving receives a response from the user indicating whether the subaddress is used for the routing of the digital facsimile message, for receiving said subaddress if the subaddress is input by the user, and for receiving a telephone number identifying the destination server to which the digital facsimile message is initially sent,
means for forming a digital facsimile message including the subaddress, and
means for sending the digital facsimile message through a communications channel;

a destination server connected to the communications channel and configured to receive the digital facsimile message, said destination server comprising,
means for converting the subaddress into a network address;

means for sending the digital message through a communications channel; and a destination server connected to the communications channel for receiving the digital message, said destination server comprising,
means for converting the subaddress into a network address, and
means for routing the digital message through a network to which said destination server and a destination terminal are connected, wherein said network address is at least one of an Internet Protocol address and an asynchronous transfer mode address.

9. An apparatus comprising:
a source terminal having
an input device on which a user inputs data,
means for prompting the user to enter whether a subaddress is used for routing a digital facsimile message to a destination terminal in a network via a destination server,
means for receiving a response input from the user on said input device, said means for receiving receives a response from the user indicating whether the subaddress is used for the routing of the digital facsimile message, for receiving said subaddress if the subaddress is input by the user, and for receiving a telephone number identifying the destination server to which the digital facsimile message is initially sent,
means for forming a digital facsimile message including the subaddress, and
means for sending the digital facsimile message through a communications channel;
a destination server connected to the communications channel and configured to receive the digital facsimile message, said destination server comprising,
means for converting the subaddress into a network address;
means for sending the digital message through a communications channel; and
a destination server connected to the communications channel for receiving the digital message, said destination server comprising,
means for converting the subaddress into a network address, and
means for routing the digital message through a network to which said destination server and a destination terminal are connected, wherein
said communications channel is a wireless communications channel.

10. An apparatus comprising:
a source terminal having
an input device on which a user inputs data,
means for prompting the user to enter whether a subaddress is used for routing a digital facsimile message to a destination terminal in a network via a destination server,
means for receiving a response input from the user on said input device, said means for receiving receives a response from the user indicating whether the subaddress is used for the routing of the digital facsimile message, for receiving said subaddress if the subaddress is input by the user, and for receiving a telephone number identifying the destination server to which the digital facsimile message is initially sent,
means for forming a digital facsimile message including the subaddress, and
means for sending the digital facsimile message through a communications channel;
a destination server connected to the communications channel and configured to receive the digital facsimile message, said destination server comprising,
means for converting the subaddress into a network address; and
means for prompting a user to enter whether the subaddress is used for routing a polling message;
means for receiving a response input from the user on said input device, said means for receiving receives a response from a user indicating whether the subaddress is used for the routing of the polling message, for receiving said subaddress if the subaddress is input by the user, receiving an identification of a file to be retrieved from said destination terminal, and for receiving a telephone number to which the digital facsimile message is to be sent; and
wherein said means for forming a digital facsimile message forms the polling message including the identification of the file.

11. The apparatus of claim 10, further comprising:
means for retrieving a file from the destination terminal corresponding to the file identification; and
means for relaying to the source terminal the file retrieved by the means for retrieving.

12. An apparatus comprising:
a source terminal having
an input device on which a user inputs data,
means for prompting the user to enter whether a subaddress is used for routing a digital facsimile message to a destination terminal in a network via a destination server,
means for receiving a response input from the user on said input device, said means for receiving receives a response from the user indicating whether the subaddress is used for the routing of the digital facsimile message, for receiving said subaddress if the subaddress is input by the user, and for receiving a telephone number identifying the destination server to which the digital facsimile message is initially sent,
means for forming a digital facsimile message including the subaddress, and
means for sending the digital facsimile message through a communications channel;
a destination server connected to the communications channel and configured to receive the digital facsimile message, said destination server comprising,
means for converting the subaddress into a network address;
means for sending the digital message through a communications channel; and
a destination server connected to the communications channel for receiving the digital message, said destination server comprising,
means for converting the subaddress into a network address, and
means for routing the digital message through a network to which said destination server and a destination terminal are connected wherein
said destination server includes,
means for receiving the digital facsimile message which includes the subaddress;
means for extracting the subaddress from the digital facsimile message; and
means for finding in a look-up table at least one of an Internet Protocol address and an asynchronous transfer mode address that matches the subaddress.

13. The appartus of claim 12, wherein the subaddress is contained in a transmit station identifier field of a digital message.

* * * * *